Feb. 7, 1928.

W. C. STEVENS 1,658,782

TIRE MAKING MECHANISM

Filed Jan. 4, 1923

Feb. 7, 1928.
W. C. STEVENS
1,658,782
TIRE MAKING MECHANISM
Filed Jan. 4, 1923
9 Sheets-Sheet 6
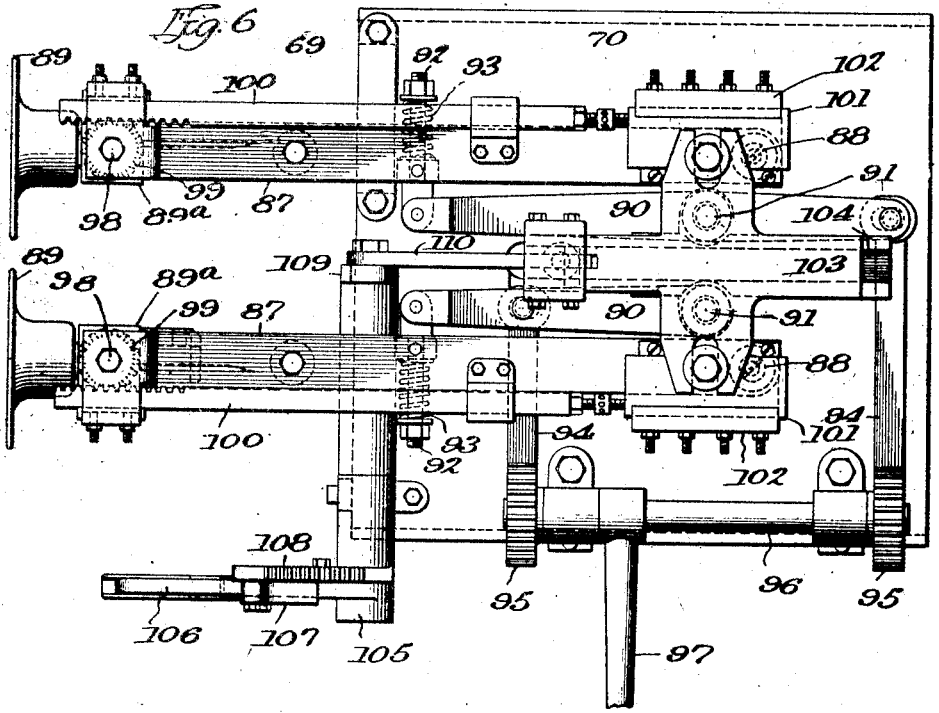
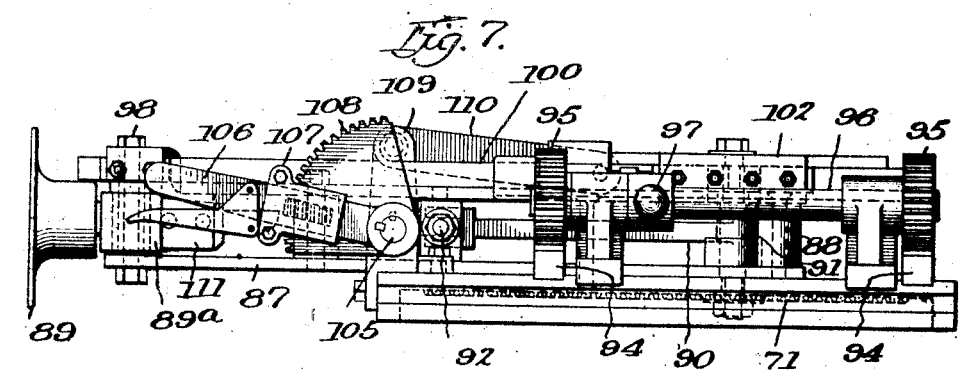
Inventor
William C. Stevens,

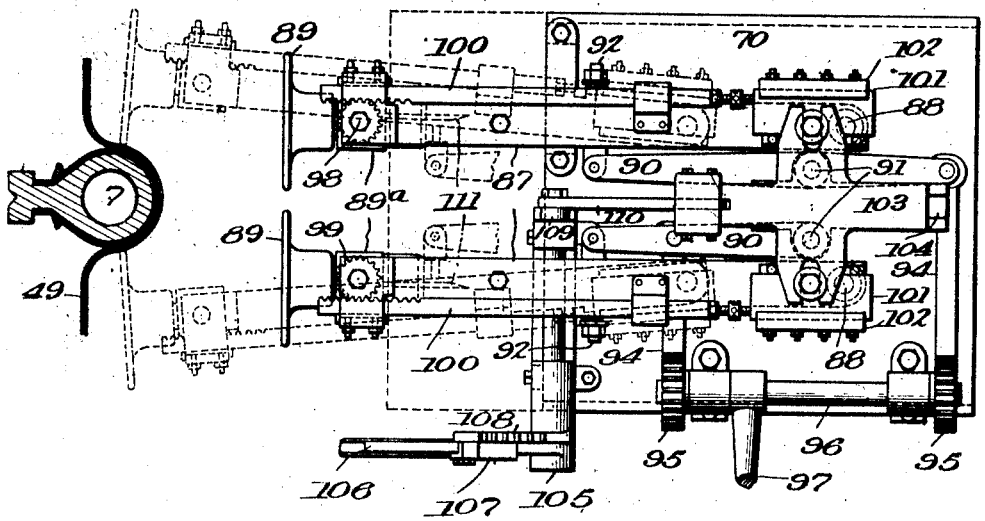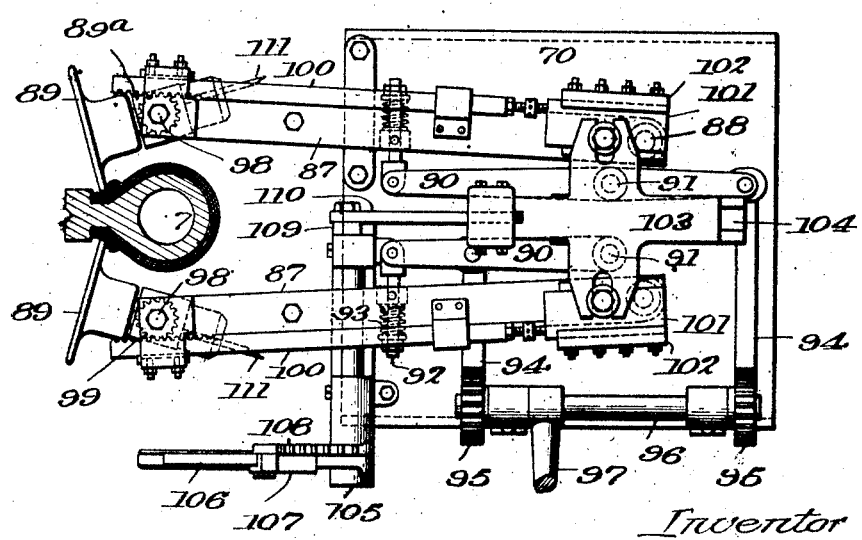

Feb. 7, 1928.
W. C. STEVENS
1,658,782
TIRE MAKING MECHANISM
Filed Jan. 4, 1923   9 Sheets-Sheet 8
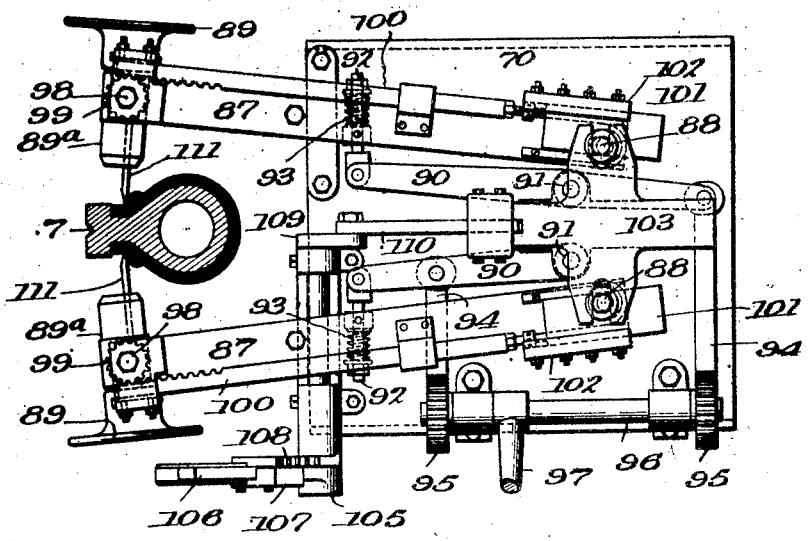
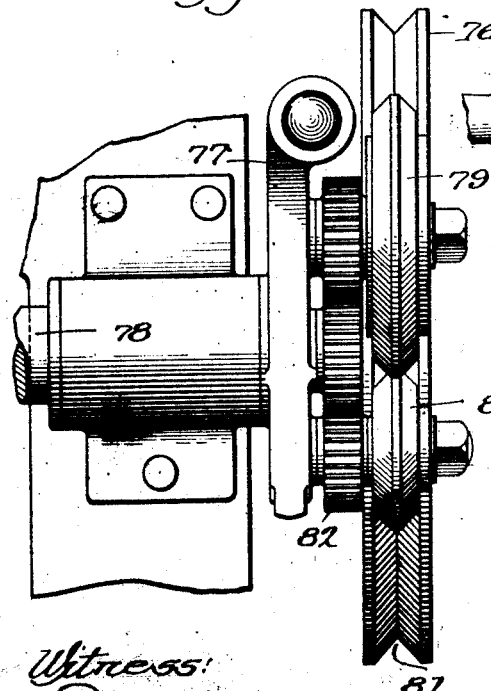
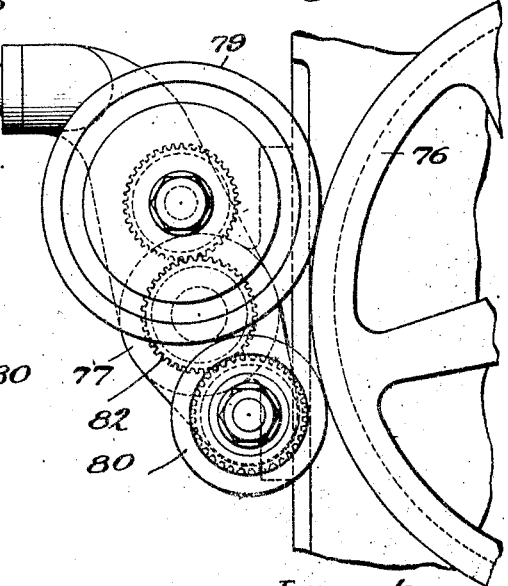
Inventor
William C. Stevens

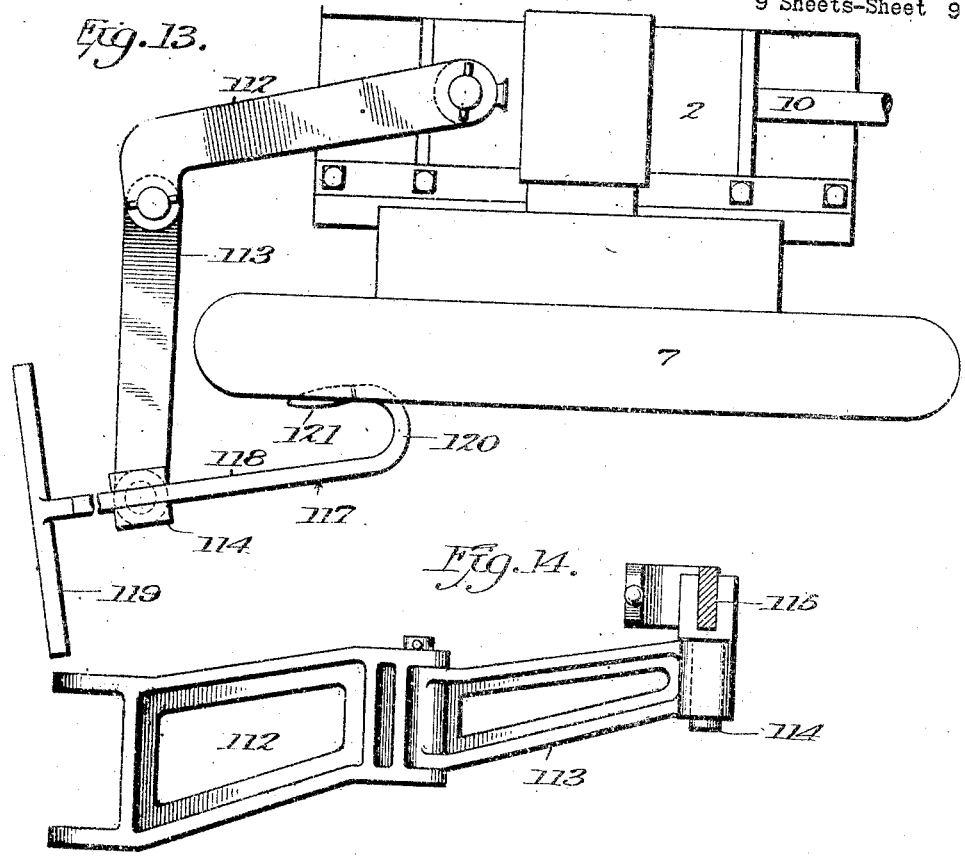
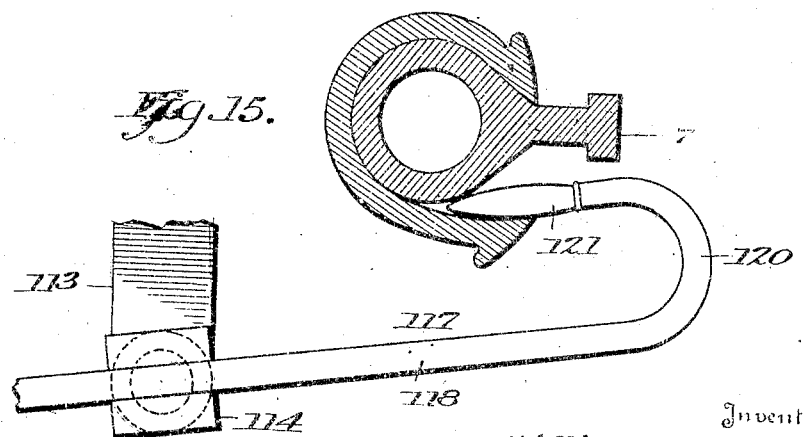

Patented Feb. 7, 1928.

1,658,782

UNITED STATES PATENT OFFICE.

WILLIAM C. STEVENS, OF AKRON, OHIO, ASSIGNOR TO THE FIRESTONE TIRE & RUBBER COMPANY, OF AKRON, OHIO, A CORPORATION OF OHIO.

TIRE-MAKING MECHANISM.

Application filed January 4, 1923. Serial No. 610,577.

My invention relates to machines for making pneumatic tires, and it is concerned particularly with mechanism for building up the carcass portion of such tires, although it is adapted for use in building the complete tire structure as will presently appear.

The general purpose of this invention is to provide a compact and practical mechanism which is adapted for use in building more than one tire at a time, to thereby increase production, economize in floor space and in the cost of tire building equipment and tire construction.

In order to build tires quickly and with uniformity in construction, it has been found an advantageous method to have each step in the building operation performed by different operators, each operator specializing in the particular step he performs, and thus becoming highly efficient and capable of performing his work with the same degree of efficiency upon each tire. By this method each particular step in the building operation is performed with the same precision and accuracy upon each tire and a uniform grade of tires is produced. It will be seen that in building tires according to this practice, and, in fact, according to other practices, the cores upon which tires are built should be arranged in rows as close together as is possible without interfering with the movements of the operators.

One of the particular purposes of my invention is to provide a form of tire building mechanism which may be arranged in rows, in side by side relation and in close proximity to provide two, or possibly more, parallel rows of tire building cores, with improved core rotating and stitcher mechanism, intermediate oppositely disposed cores of each row, so that a minimum area of floor space is required in installing a number of these mechanisms and two rows of tires may be in the process of building at the same time. The particular method of building tires and the arrangement of mechanisms above outlined are not, however, essential to the utility of my invention, as will presently appear.

Another purpose of my invention is to provide a tire building mechanism which embodies more than one core and a common driving unit having individual controlling means for each core, so that the core may be rotated by different operators either simultaneously, or independently, at different speeds and in either direction.

Still another purpose of my invention is to provide a tire building mechanism embodying more than one core and a common fabric supply and adapted for building different sizes of tires and tensioning the fabric in the same degree in each tire.

My invention also comprehends individual stitcher mechanism for each core adapted to be independently positioned relative to the cores by a common driving mechanism, and novel control mechanism for adjusting the pressure of the stitchers against the cores and changing the angle of the stitchers.

My invention also comprehends a tire building mechanism having a rotary core and a reciprocable stitcher carriage actuated by a common variable speed driving unit, and auxiliary driving means for varying the speed of the carriage relative to that of the core.

Another feature of my invention is a combined stitcher and trimming unit for each core and novel devices for positioning the unit relative to the core and locking it in the desired position.

An ancillary object of my invention is to provide an improved stripping device for facilitating the removal of the tires from the cores.

The foregoing and other objects of my invention will be more fully understood when the following description is read and upon reference to the drawings accompanying and forming a part of this specification.

In the drawings which illustrate a preferred embodiment of my invention:

Figure 6 is a plan view of a stitcher mechanism embodied in my invention;

Figure 7 is an elevational view looking at one side of the stitcher mechanism;

Figure 8 is a plan view illustrating the manner in which my stitcher mechanism operates against a tire building core;

Figure 9 is a plan view illustrating the operation of my stitcher mechanism as the stitchers round the bead portions of a tire;

Figure 10 is a plan view illustrating the operation of trimmer instrumentalities embodied in my stitcher mechanism;

Figure 11 is a detail view showing a two speed device for advancing the stitcher mechanism toward the core.

Figure 12 is a side elevational view of the structure shown in Figure 11;

Figure 13 is a plan view illustrating the tire stripping devices forming a part of my novel mechanism;

Figure 14 is an elevational view of an adjustable support forming a part of the tire stripping devices; and Figure 15 is a plan view, partly in section, illustrating the operation of the stripping devices.

Figure 1:
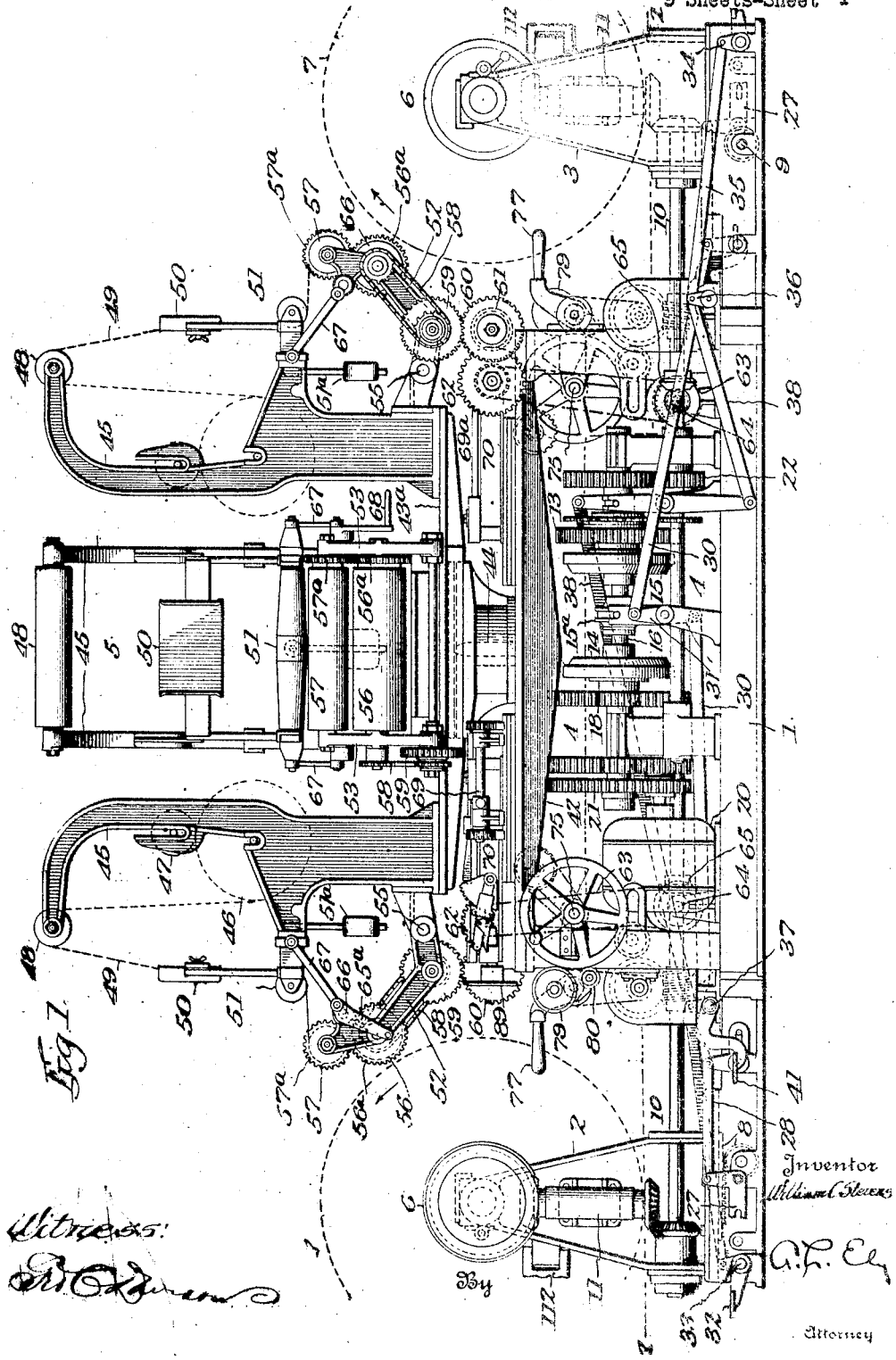
Figure 1 is a side elevational view of a mechanism constructed in accordance with my invention.
Figure 2:
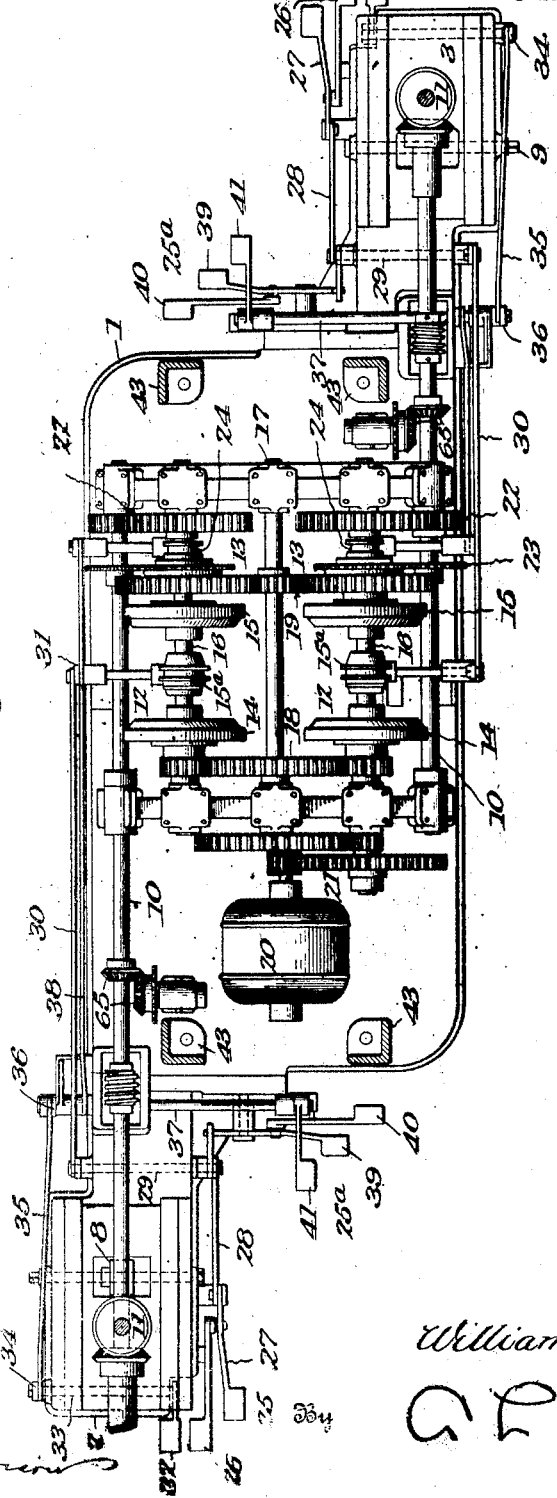
Figure 2 is a horizontal sectional view taken substantially on the line 2—2 of Figure 1.

Upon reference to the drawings and particularly to Figures 1 and 2, it will be seen that my present invention embodies a peculiar form of base 1 constructed to support, in this instance, two core stands, 2 and 3 respectively, in opposite relation, and upon each side of a common driving unit 4 and a common fabric supplying turret 5.

The core stands 2 and 3 are, in each instance, offset from the longitudinal center line of the base 1 and located upon opposite sides of said center line. The offset position of the stands enables me to use an individual drive shaft for rotating each core, to drive both shafts from a common variable speed driving unit, previously referred to as 4, and to position the driving unit intermediate the core stands and the shafts to thereby procure a compactly arranged mechanism, all of which will be seen by reference to Figures 1 and 2. The core stands 2 and 3 may be of any suitable construction adapted to support a rotary chuck, such as that indicated at 6, for carrying the usual tire building core 7. Preferably the core stands 2 and 3 are mounted to reciprocate longitudinally of the base 1 in parallel planes so that they may be adjusted relative to the turret 5 to properly space different sizes of cores therefrom. For this purpose I provide rack and pinion devices 8 below each stand operated by manually rotatable shafts 9.

The driving unit 4 comprises the following. Each chuck 6 is rotated by an individual driven shaft 10. The shafts 10 extend horizontally toward the transverse center of the base 1 and are disposed in parallel relation upon opposite sides thereof. At their outer ends shafts 10 are each connected by a series of suitably arranged beveled gears 11 to one of the chucks 6, the gears being adapted to permit adjustment of the stands 2 and 3 longitudinally of their respective shafts. At their inner ends the shafts 10 are driven by individual speed change devices 12 and reversing devices 13. Each speed change device includes a high speed clutch 14 and a low speed clutch 15 arranged to clutch or release a shaft 16. No particular form of clutch is essential to my invention. In the present instance, I have indicated a form of clutch adapted to clutch or release the shaft 16 when said clutches are engaged by sliding sleeves 15ª upon the shafts 16. The shafts 16 are suitably journaled intermediate the shafts 10 and upon opposite sides of a constantly rotating shaft 17. A gear train 18 couples the clutches 14 to be rotated in unison by the shaft 17 and a similar gear train 19 connects the clutches 15 for operation in a like manner. A motor 20 and gear train 21 rotate the shaft 17. Shafts 16 are each geared at one end to one of the shafts 10, as at 22, so that the cores 7 are rotated in the direction indicated by the arrows. A sprocket and chain connection 23 connects each shaft 16 with one of the shafts 10 for driving the cores 7 reversely. Clutches 24 are arranged upon the shafts 16 to clutch the sprocket and chain connections to said shafts when they are driven at either speed so that the cores may be rotated reversely at high or low speed. This reversing feature is particularly advantageous when the operators are applying finishing strips, bead rings, etc. to the carcass and enables them to work quickly, as will be apparent to those skilled in the art.

Adjacent each core stand 2 and 3, two series of pedals are arranged for operating the cores 7 from the driving unit 4. The pedals are identically arranged for each core stand, hence a description of the pedals for the left-hand core stand will suffice herein. Each series comprises three pedals, the first series 25 being arranged so that an operator may actuate the driving unit from the front of the core, whereas the series 25ª is arranged for operation from one side of the core so that the operator may actuate the driving unit in conjunction with a stitcher mechanism, presently described. Series 25 includes a high speed pedal 26 adapted, when depressed, to rock a pivoted bell crank pedal 27 in one direction. One arm of the bell crank pedal 27 is connected by a link 28 to one end of a rock shaft 29 which at its opposite end is connected by a link 30 to a rocker arm 31. Rocker arm 31 is arranged to shift one of the sleeves 15ᵃ to cause the clutch 14 to carry its shaft 16 and to rotate its associated shaft 10 at high speed. The other arm of the bell crank pedal 27 is arranged to be independently operated to shift the sleeve 15ᵃ in the opposite direction and to actuate the clutch 15 to carry the shaft 16 and rotate the shaft 10 and its core 7 at low speed. Pedal 32 of series 25 is arranged to rock a shaft 33 having an upstanding arm 34 that is connected by a link 35 with an upstanding arm 36 upon a second rock shaft 37. Shaft 37 is connected by a link 38 with one of the clutches 24 so that when the pedal 32 is depressed, its associated clutch 24 is engaged with the shaft 16 and its associated shaft 10 and core 7 are driven in reverse. Series 25ᵃ also includes three pedals, i. e., a high speed pedal 39, a low speed pedal 40, and a reverse pedal 41. Pedals 39 and 40 are connected, in any suitable manner, to rock the shaft 29 to actuate the sleeve 15ᵇ in the manner before described with reference to the pedals 26 and 27, whereas the pedal 41 is connected to the cross shaft 37 to reverse the core, as will be apparent without further explanation. Suitable devices, such as springs, or the like (not shown), may be utilized to return the pedals, if desired.

Figure 3:
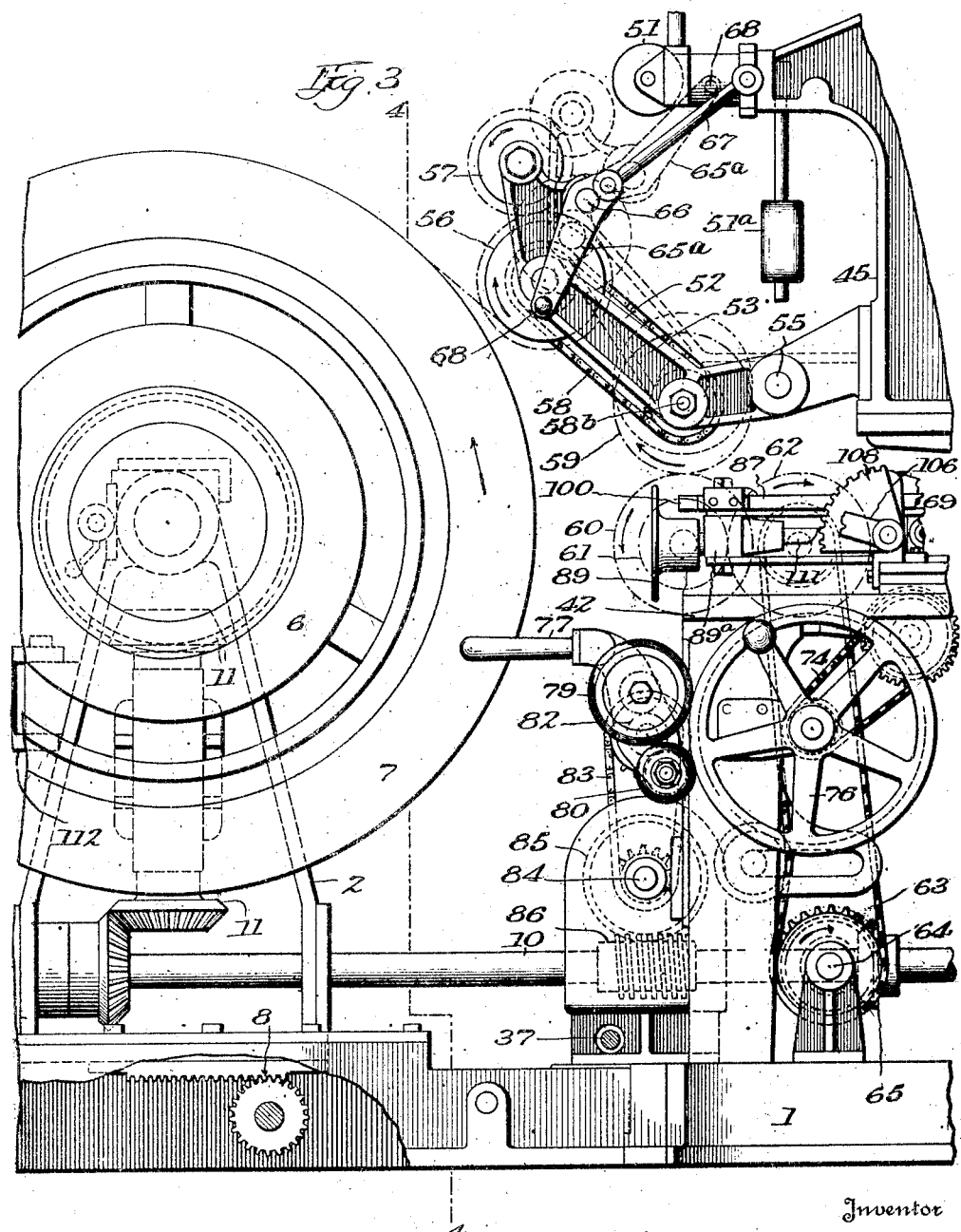
Figure 3 is a side elevational view, on an enlarged scale, of a portion of my apparatus.
Figure 4:
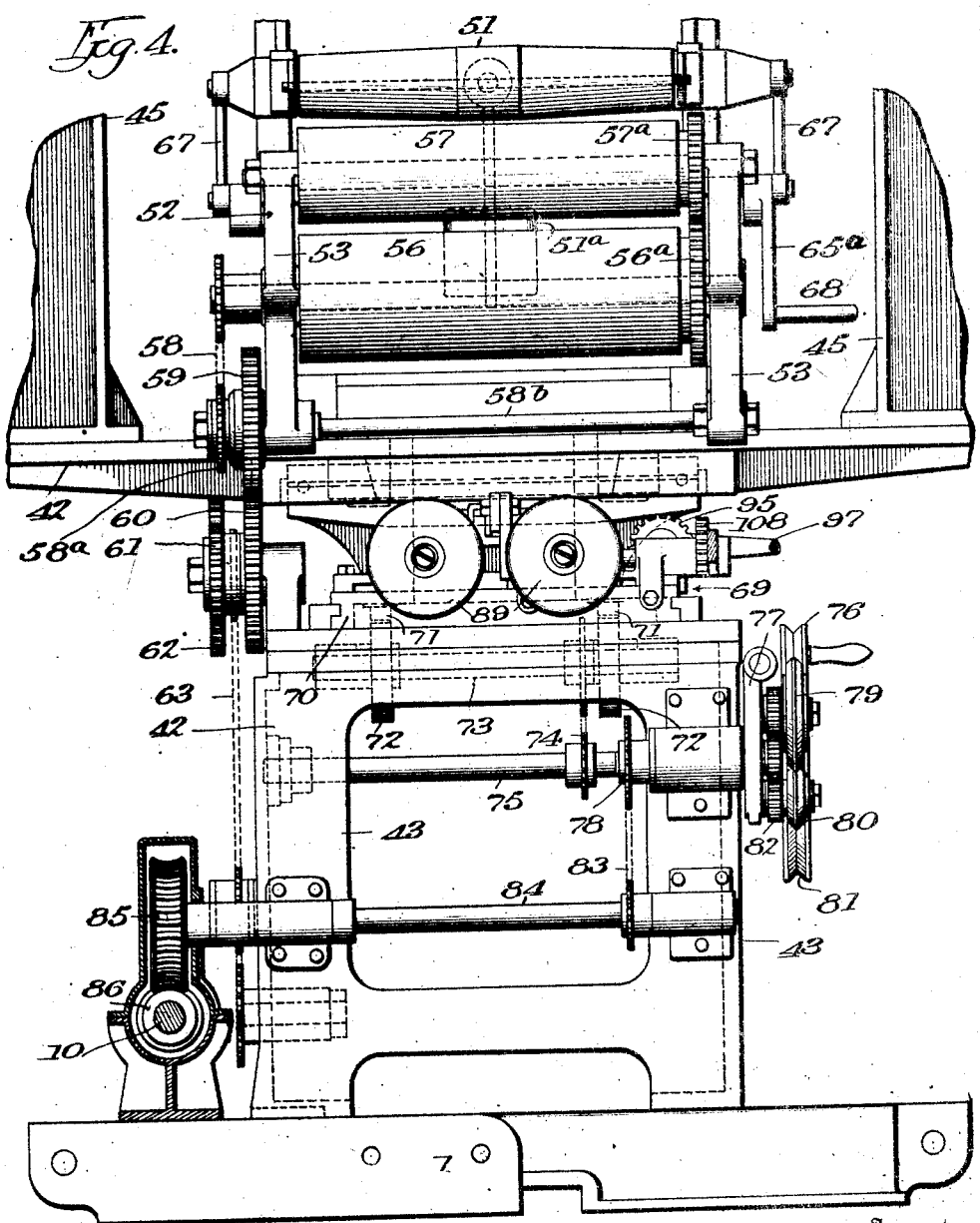
Figure 4 is a transverse sectional view taken on the line 4—4 of Figure 3.
Figure 5:
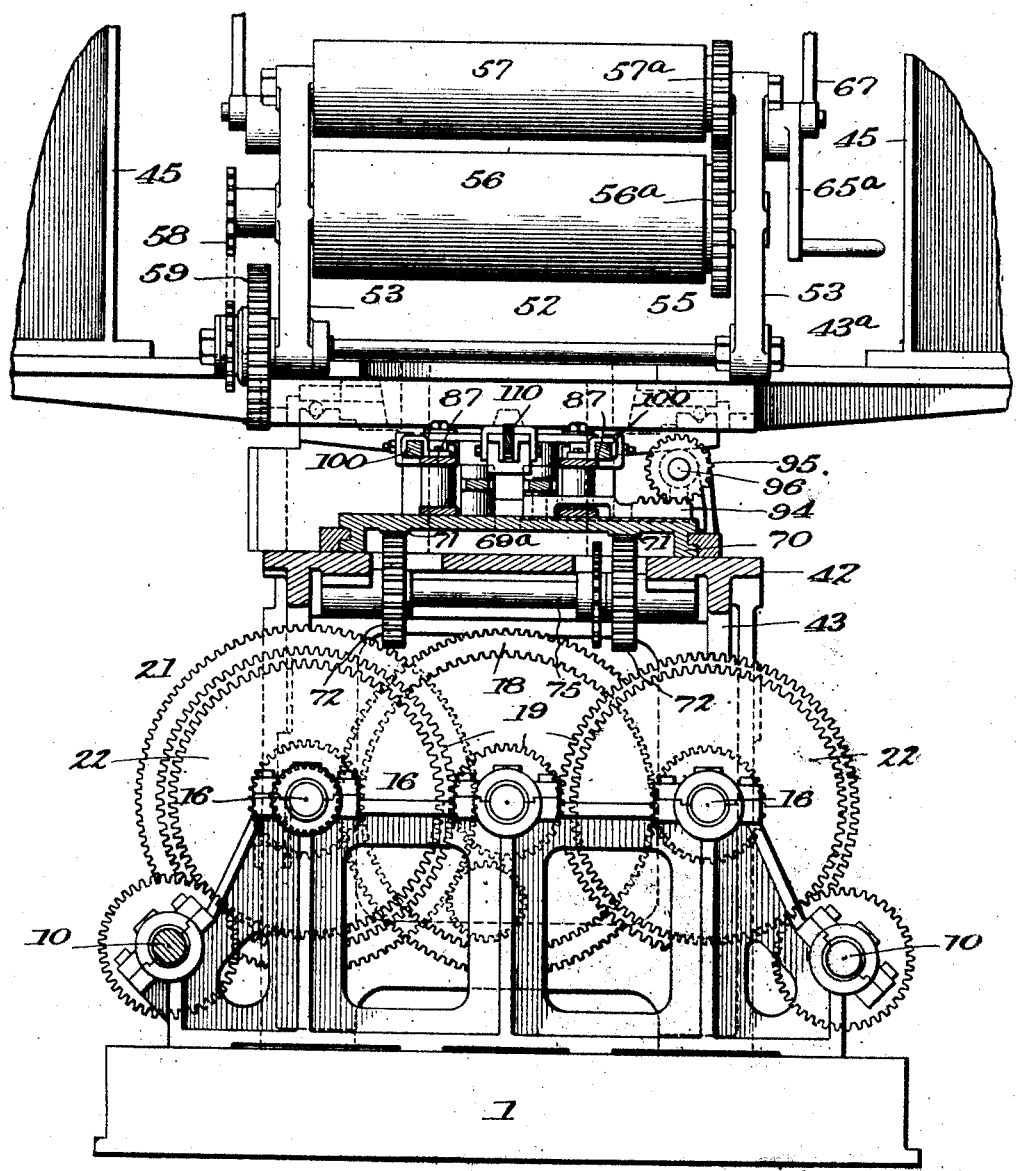
Figure 5 is a transverse sectional view taken through the right-hand side of the mechanism, as it is shown in Figure 1, looking toward the center thereof.

The fabric supplying turret 5 is constructed and mounted as follows. A horizontal table 42 is supported intermediate the core stands 2 and 3 upon suitable legs 43 arising from the base 1. The table 42 is located over the driving unit 4 and supports a revoluble horizontal spider 43ᵃ that is spaced from the table for a purpose presently apparent and arranged to revolve about a centrally located stud 44. The stud is suitably constructed and arranged to permit revolution of the spider 43ᵃ in one direction only and to lock it in any desired position. A plurality of vertically disposed brackets 45 are carried by the spider 43ᵃ to revolve about the pin 44. Brackets 45 are arranged in pairs, the brackets of each pair being constructed with vertically aligned bearings to support a reel of tire fabric 46 and a liner reel 47 resting upon and rotated by the fabric reel. Each pair of brackets 45 is positioned upon the spider so that they may be revolved to position the axis of the fabric reels 46 parallel with the axis of either chuck 6 to feed the fabric from any reel upon either core 7. Above the reels 46 and 47, each pair of brackets 45 carries a horizontal idler roller 48 over which the fabric strip 49 from the reel 46 is trained. From the idler roller 48 the strip 49 travels downwardly over a vertically disposed automatically adjustable guide shoe 50 and then under a horizontal guide roller 51. The shoe 50 and roller 51 are pivoted to oscillate on a horizontal axis as a unit upon the brackets and are counterweighted, as at 51ᵃ, to normally maintain the position illustrated in the drawings. The function of the counterweighted shoe 50 is to guide the fabric transversely of the core so that it will be centered with respect to the core. Adjacent the base of each pair of brackets 45, a pivoted frame 52 is mounted to swing in a vertical plane toward or from the cores and downwardly toward the top portions thereof. The frames 52 comprise spaced apart arms 53 pivoted at their lower ends at 55 and constructed to project forwardly and upwardly. The free ends of the arms 53 carry therebetween two horizontal retarding rollers 56 and 57, the former being located above the latter. The strip 49 is led forwardly beneath the roller 51 over the roller 57 then between rollers 56 and 57 and under the latter to the core 7 upon which its end is cemented in the usual manner. Rotation of the core pulls the strip through the rollers, as will be obvious. The upper roller 57 is smaller than the lower one 56 and said rollers are geared together, as at 56ᵃ and 57ᵃ, so that they rotate in opposite directions. These rollers 56 and 57 are relatively proportioned and geared together so that the peripheral speed of the roller 57 is less than that of the roller 56, the ratio being such that the strip is held taut between the rollers, but is not stretched thereby. The rollers 56 are rotated, in a manner presently described, at the proper speed relative to that of the cores and in the proper direction to feed the strip to the cores with the desired tension or stretch. Each roller 56 is rotated by a sprocket and chain connection 58 from sprocket gear 58ᵃ carried on shaft 58ᵇ upon the frame 52 to be raised or lowered with the frame. The shaft 58ᵇ carries a gear 59 which may be meshed with a gear 60 supported on table 42 and arranged in a suitable position to be engaged by the gears 59 when the turret 5 is revolved moving any one of the fabric reels 46 in feeding position relative to either core 7. Gears 60 carry companion gears 61 which are rotated by gears 62. Gears 62 are mounted upon the table 42 and are driven by individual sprocket and chain connections 63 from shafts 64. Shafts 64 are driven respectively by individual bevel gear connections 65 to the chuck driving shafts 10, the gearing being so proportioned that the desired stretch is imparted to the fabric. At this point it should be mentioned that other gears may be substituted for gears 61 and 62 to vary the ratio of speed of the rollers 56 to that of the chucks 6 so that different sizes of cores may be used without stretching the strip 49 after it leaves the rollers 56. The gears 59 are disengaged from the gears 60 by raising the frames 52 vertically so that the turret 5 may be revolved to bring another reel 46 in feeding position relative to either core 7. To hold the frames 52 in raised position, each frame is provided with a hand lever 65ª pivoted intermediate its ends, as at 66, upon the frame. One end of the lever 65ª is pivotally connected to one end of a link 67, the other end of the link being pivoted to the adjacent bracket 45. The disposition of the lever 65 and the link 67 is such that lever 65 may be swung around its pivot 66, when the frame 52 is in lowered position to raise said frame and lock the lever 65 and the link 67 with their pivot points beyond a dead center position. In this position of the frame, a handle 68 upon the lever 65 engages the link 67 and holds the frame in raised position. In the drawings, see Figure 3, one frame 52 is shown in raised position in broken lines. Upon the table 42 individual stitcher units, 69 and 69ª respectively, are provided for each core. The stitcher units being identical, a description of one will suffice herein. I will describe the unit 69 at the left of the machine, as shown in Figures 1 and 5 to 10 inclusive.

Stitching unit 69 comprises a horizontal carriage 70 guided upon the base 1 for movement toward or from the core stand 2. The carriage is moved toward the stand 2 by parallel racks 71 secured upon its lower face and meshing with toothed pinions 72 fixed upon a shaft 73. Shaft 73 is journaled upon the table 42 and is driven by a sprocket and chain connection 74 to a similarly located shaft 75. Shaft 75 is designed to be mechanically driven in a manner presently described, to move the carriage 70 toward the core, but is preferably rotated to move the carriage rearwardly by a hand wheel 76 upon one end thereof. For driving the carriage forward, I provide an oscillating lever 77 adjacent the hand wheel 76 pivoted intermediate its length to rock upon a driven stud shaft 78. The lever 77 carries two friction wheels 79 and 80 respectively of different sizes, the wheels being mounted so that one wheel engages a groove 81 in the periphery of the wheel 76 when the lever is rocked in either direction. These wheels 79 and 80 constitute auxiliary high and low speed drives respectively for moving the carriage 79 toward the core stand. They are geared to the stud shaft 78, as at 82, to both rotate in the same direction. A sprocket and chain connection 83 connects the stud shaft 78 with a cross shaft 84 adapted to be driven from one shaft 10 by a worm wheel 85 and a worm gear 86. From the foregoing it will be seen that the speed at which the carriages move forward may be changed relative to the speed of the shafts 10 when said shafts are being driven by either the high speed clutches 14 or by the low speed clutches 15.

A pair of normally parallel stitcher arms 87 are pivoted at their rear ends upon the carriage 70 to project longitudinally thereof over the front edge of the carriage and receive the core between their projecting ends. The stitcher arms are swung about their pivots 88 to press a pair of rotatable stitcher discs 89 against the sides of the core by means of individual rocker arms 90, each of which is pivoted upon the carriage 70, as shown at 91. The arms 90 also extend longitudinally of the carriage and at their forward ends are connected to the intermediate portions of the stitcher arms 87 by pivoted bolts 92 and springs 93 arranged so that the stitchers 89 are yieldingly pressed against the sides of the core 7. The arms 90 are rocked in opposite directions to position the stitchers against the core by individual sliding racks 94 that extend transversely of the carriage toward one edge thereof. Each rack 94 is pivoted at its inner end to one of the arms 90. A pair of toothed pinions 95 mesh respectively with the racks 94 and are fixed respectively upon a shaft 96 arranged to be rocked by a hand lever 97. As the stitchers engage the core, the hand lever 97 and shaft 96 are rocked to actuate the arms 90 and press the stitchers against the sides thereof with a uniform pressure. The mechanism for operating the stitchers is easily handled to obtain the correct pressure of the stitchers and can be operated with one hand while the lever 77 is being held in position to move the carriage forward at either high or low speed. An operator soon becomes more skilled with this form of mechanism than with mechanically pressed stitchers with which it is difficult to obtain the correct degree of pressure and to prevent injury to the fabric.

The stitchers 89 are rotatably mounted upon sleeves 89ª which are arranged to swing about vertical studs 98 to present them at the desired angle against the sides of the core. Each stud carries a toothed pinion 99 which meshes with the forward end of a rack bar 100 carried by each arm 87. The racks 100 are mounted to reciprocate upon the arms 87 and have their rear ends adjustably affixed in blocks 101. Blocks 101 are mounted to slide longitudinally of the arms 87 in guides 102 thereon and are actuated by a cross head 103. The cross head 103 is guided, as at 104, to reciprocate upon the carriage 70 longitudinally of and between the arms 87 and is connected to the blocks 101 so that they move with the arms 87 about the pivots 88 of the latter. A crank shaft 105 is arranged upon the forward edge of the carriage to be rocked by a hand lever 106. A detent 107 upon the hand lever 106 engages a rack 108 to hold the shaft in any desired position. One portion 109 of the crank shaft 105 is connected to the cross head 103 by a link 110, so that when the crank shaft is rocked in either direction, the cross head will be reciprocated to move the blocks 101 and the rack bars 100 and swing the discs 89 in the desired position relative to the core 7. Trimming tools 111 are carried by the stitcher mountings 89ª in such position relative thereto that by operation of the lever 106, the stitchers 89 may be swung from engagement with the core and the tools 111 presented thereagainst for trimming the edges of the bead portions of the carcass.

Upon each core stand 2 and 3, an arm 112 is pivoted to swing about a vertical axis and to project toward the front of the core. Each arm 112 carries an extension 113 that is pivoted at one of its ends to swing about a vertical axis and across the front of the core. The other end of the extension 113 carries a vertically disposed rotatable stud 114 having a bifurcated upper end 115. The stud 114 is designed to receive a stripping tool 117 which comprises a straight shank portion 118 adapted to seat in the bifurcated end 115 of the extension 113. One end of the tool is provided with a handle 119 so that the stud may be rotated to position the shank portion 118 of the tool relative to the core. The other end of the shank 118 is bent to form a hook 120 projecting toward the core when the tool is in position and terminating in a pointed conical portion 121 that extends parallel with the shank 118. The portion 121 is designed to be inserted between the core and the carcass, and the core rotated to break the adhesion between the core and carcass and facilitate in removing the latter.

It is believed that the operation and advantages of my invention will be apparent from the foregoing description.

Although the description is somewhat detailed and certain specific terms and language have been used therein, it is to be understood that various changes and modifications are within the spirit of my invention and are intended to be comprehended by the present disclosure.

What I claim is:

1. Mechanism for building tires comprising, a base member, oppositely disposed core supporting chucks mounted to rotate upon the base member, a common drive unit intermediate the chucks, means for feeding a strip of fabric to the cores, rotary means for retarding the strip as it is fed onto the cores, means actuated from said drive unit for driving said rotary means, the latter being movable from a position adjacent one core chuck to a position adjacent the other and being further movable at either position into or out of engagement with the drive unit, individual stitcher units for each core, and a reciprocable carriage for each unit actuated in one direction by said drive unit.

2. In mechanism of the class described, in combination, a rotatable core chuck, a revolving support for positioning a roll of fabric relative to the core, a swinging guide upon the support between the roll and the core, means for rotating the core, fabric retarding rollers carried by the support for movement therewith and when positioned for operation being between the guide and the core, and means for swinging the rollers into and out of driving engagement with the core rotating means when the retarding rollers are so positioned.

3. In mechanism of the class described, in combination, a rotary core chuck, means for rotating the chuck, a revoluble support for positioning a roll of fabric relative to the core, fabric retarding rollers carried by so as to be both movable with and movable on the support, means actuated by said chuck-rotating means for rotating the rollers and means operable to move the rollers in or out of engagement with the last mentioned means.

4. In mechanism of the class described, in combination, a rotary core chuck, means for rotating the chuck including variable speed change devices, a revoluble support for positioning a roll of fabric relative to the core, fabric retarding rollers upon the support movable therewith and mounted to swing toward or from the core, and means actuated by said first means for rotating the rollers at fixed ratio of speed relative to that of the chuck said means being arranged to rotate the rollers when they are swung toward the core.

5. In mechanism of the class described, in combination, a rotary core chuck, means for rotating the chuck, a revoluble support for positioning a roll of fabric relative to the core, fabric retarding rollers upon the support movable therewith and mounted to swing toward or from the core, means for rotating the rollers when they are swung toward the core at a fixed ratio of speed relative to that of the chuck, a stitcher unit adapted to be moved toward the core by said core rotating means, and means for varying the speed of movement of the unit relative to that of the core.

6. In mechanism of the class described, in combination, core supporting means, a reciprocable stitcher carriage, a stitcher supporting arm mounted to swing upon the carriage, a rotatable stitcher mounting upon one end of the arm, a stitcher upon said mounting, a trimming element upon the mounting, means for swinging the arm, and means for rotating the mounting.

7. In mechanism of the class described, in combination, core supporting means, a reciprocable stitcher carriage, a pivoted stitcher supporting arm upon the carriage, a rotary mounting upon the arm, a stitcher upon the mounting, a trimming element upon the mounting, a rocker arm yieldingly connected to the stitcher arm, means for rocking the second arm, and means for rotating the mounting.

8. In mechanism of the class described, core supporting means, a reciprocable stitcher carriage, a stitcher supporting arm upon the carriage, a rotatable mounting upon the arm, a stitcher upon the mounting, a cutting element upon the mounting, and means for rotating the mounting.

9. In mechanism of the class described, in combination, core supporting means, a reciprocable stitcher carriage, a stitcher supporting arm mounted to swing upon the carriage, a rotatable stitcher mounting upon the arm, a stitcher upon the mounting, a cutting element upon the mounting, a reciprocable element upon the carriage, a connection between the element and the mounting, and means for reciprocating the element and locking it against movement upon the carriage.

10. In mechanism of the class described, core supporting means, a reciprocable stitcher carriage, a stitcher supporting arm mounted to swing upon the carriage, a rotatable mounting upon the stitcher arm, a stitcher upon the mounting, a cutting element upon the mounting, means for swinging the arm, and means for rotating the mounting and locking it against rotation.

11. In mechanism of the class described, core supporting means, a reciprocable stitcher carriage, a stitcher supporting arm mounted to swing upon the carriage, a rocker arm upon the carriage yieldingly connected to the first arm, means for rocking the arm, a rotatable mounting upon the stitcher arm, a stitcher upon the mounting, a cutting element upon the mounting, and means for rotating the mounting and locking it against rotation.

12. In a tire making machine, a core, an arm movable radially and axially of the core, a stitching roller and a trimming knife on said arm, and means operable to present either the roller or the knife selectively to the core.

13. In a tire making machine, a core, an arm movable radially of the core, a rotatable mounting in the end of the arm, a stitcher and a trimming knife carried at different points on said mounting, and means to rotate the mounting to present the stitcher at different angles with respect to the core or to present the knife to the core.

14. In a tire making machine, oppositely disposed cores, a turntable between the cores, fabric supply rollers and stretching rollers movably mounted on and movable with the turntable, means to drive the cores, and driving mechanism from the core driving means adapted to actuate the stretching rollers when the rollers are moved to a position on the turntable in which they will engage with said driving mechanism.

15. In a tire making machine, oppositely disposed cores, a turntable between the cores, fabric supply rollers and stretching rollers carried by and movable on the turntable to be positioned in alignment with and to be operable toward either core, means to drive the cores, driving mechanism from the core driving means adapted to actuate the stretching rollers, and means to move the stretching rollers into and out of engagement with the said driving mechanism.

16. In a tire making machine, oppositely disposed cores, mechanism for driving the cores, a turntable between the cores, exposed gearing adjacent each core, stretching rollers on the turntable mounted to move therewith and also movable thereon into operative relation with either core, gears on the turntable for driving the stretching rollers, said gears being movable on the table to and from meshing relation with the exposed gearing, and means to mesh the last named gears with the exposed gearing.

17. In a tire making machine, oppositely disposed driving mechanism for the cores, a turntable between the cores, exposed gearing actuated by the core driving mechanism, fabric supplying and stretching rollers on the turntable bodily movable therewith and also movable relatively thereto when positioned at either core, gearing on the turntable for driving the stretching rollers, and means to raise or lower the gearing on the turntable to connect or disconnect it from the exposed gearing.

WILLIAM C. STEVENS.